Nov. 15, 1966 — E. H. THOMPSON ETAL — 3,286,212
MAGNETIC CAMERA SUPPORT FOR USE WITH TRIPOD
Filed June 19, 1964
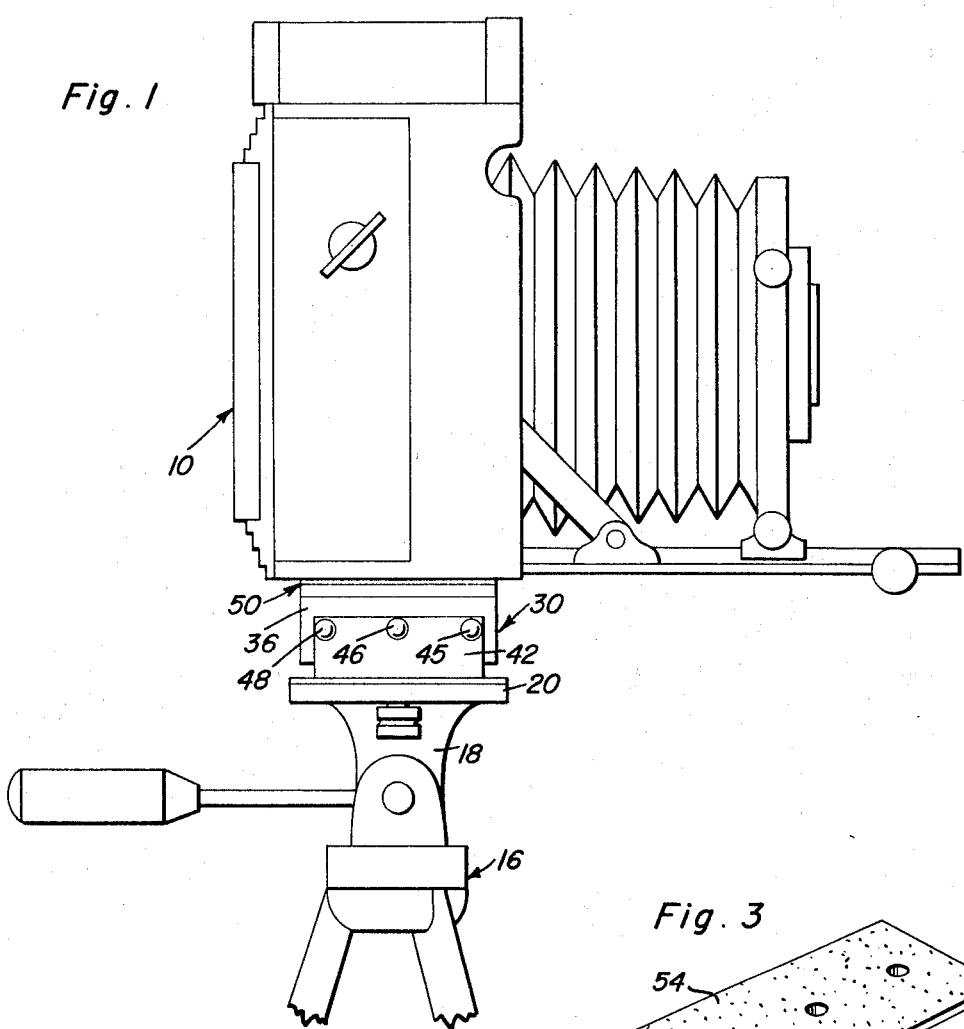
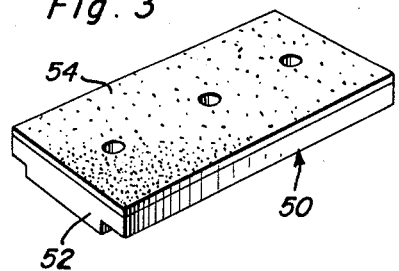
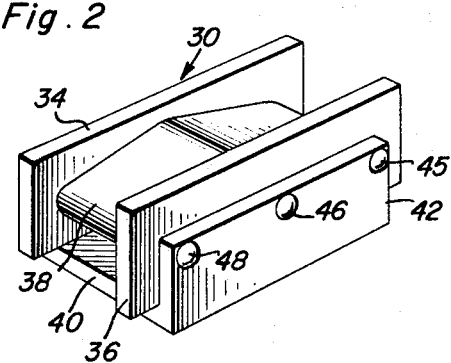
Edward H. Thompson
Vern S. Justin
INVENTORS Nov. 15, 1966  E. H. THOMPSON ETAL  3,286,212
MAGNETIC CAMERA SUPPORT FOR USE WITH TRIPOD
Filed June 19, 1964  2 Sheets-Sheet 2
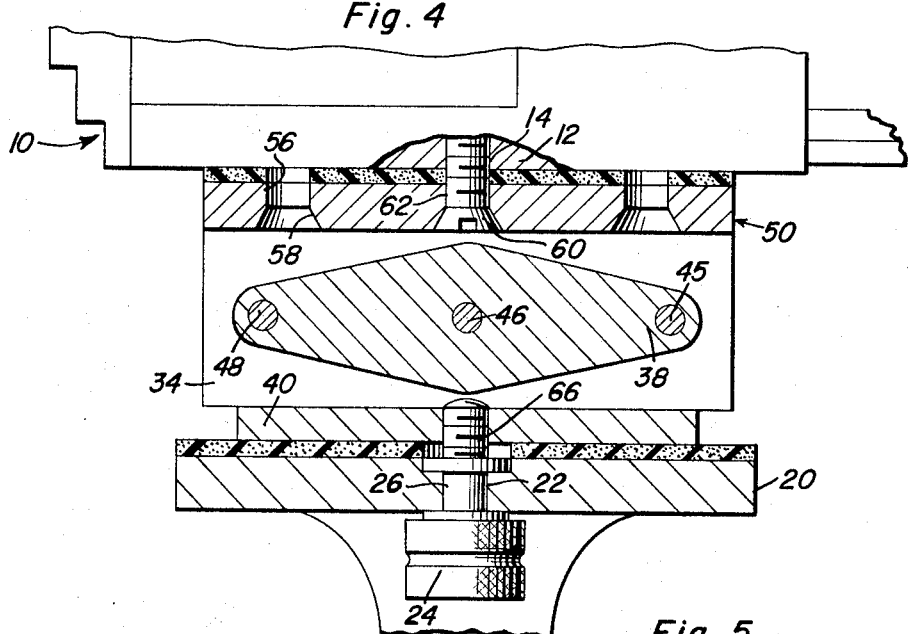
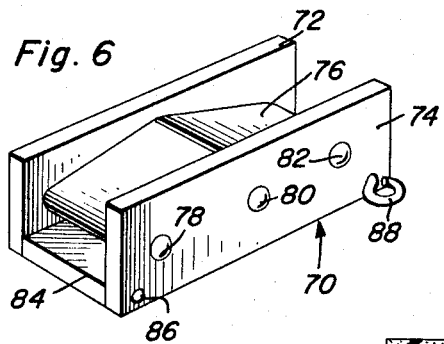
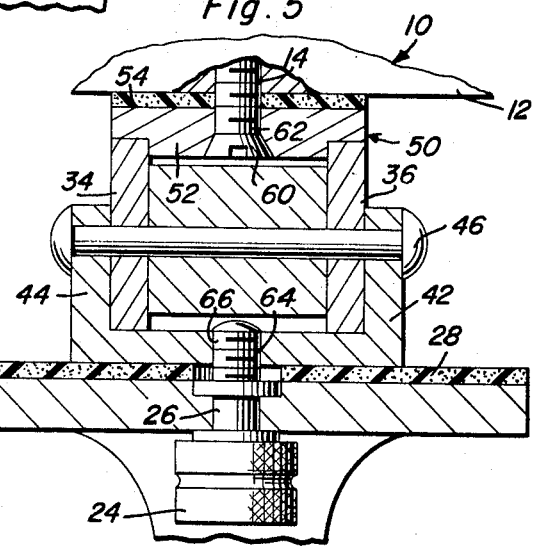
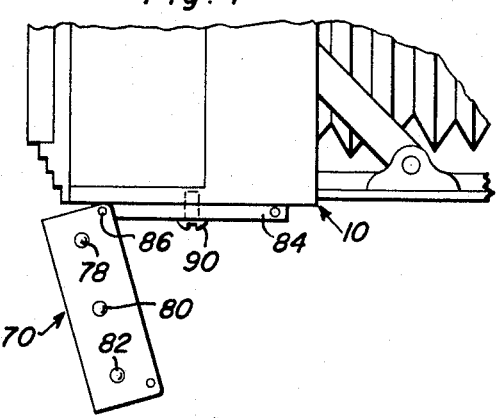
Edward H. Thompson
Vern S. Justin
INVENTORS
BY Clarence A. O'Brien
and Harvey B. Jacobson
Attorneys

United States Patent Office 3,286,212
Patented Nov. 15, 1966

3,286,212
MAGNETIC CAMERA SUPPORT FOR USE
WITH TRIPOD
Edward H. Thompson, 8550 SW. 125th St., and Vern S.
Justin, 3361 SW. 3rd St., both of Miami, Fla.
Filed June 19, 1964, Ser. No. 376,468
6 Claims. (Cl. 335—285)

This invention relates to a novel and useful magnetic camera support and more specifically to a support designed primarily for the purpose of semi-permanent securement to a camera and to provide a means whereby the portion of the support semi-permanently secured to the camera and therefore the camera may be releasably magnetically secured to a tripod or other supporting surface.

A first form of the magnetic camera support of the instant invention includes a first portion which may be semi-permanently secured to the base of a camera and a second portion having magnetic properties adapted for magnetic securement to various types of support members also having magnetic properties and to the first portion of the camera support.

A second form of the invention also includes a first base portion adapted for semi-permanent support to the bottom or any suitable portion of conventional types of cameras and which is constructed of a material having magnetic properties. The second form of the instant invention also includes a second base portion constructed of a material having magnetic properties and which is specifically adapted for magnetic securement to any suitable support member and to said first portion of said second form. The two base portions, adapted for semi-permanent securement to a camera and a tripod, are shaped such that they may be interfitted with one another and inasmuch as each is constructed of a material having magnetic properties, they may be magnetically secured together in interfitted relation thereby securing the associated camera to the associated tripod in a manner such that relative movement will not occur between the camera and the tripod, the two base portions also being pivotally secured to each other thereby enabling one base portion to be pivoted into and out of interfitted engagement with the other.

The main object of this invention is to provide a magnetic camera support operable to magnetically secure an associated camera to various types of supporting structures.

Another object of this invention, in accordance with the immediately preceding object, is to provide a magnetic support including means by which a first portion of the magnetic support may be secured to a camera and a second portion of the magnetic support may be secured to a camera tripod or the like with the two portions of the magnetic support being securable together by magnetic attraction in interfitted relation.

Another object of this invention is to provide a magnetic support in accordance with the preceding objects including means adapting the magnetic support to be readily semi-permanently and removably secured to various types of cameras.

A final object of this invention to be specifically enumerated herein is to provide a magnetic camera support in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the upper portion of a conventional form of camera tripod shown with the magnetic camera support of the instant invention being utilized to secure a press-type camera to the camera tripod;

FIGURE 2 is a perspective view of a first base portion of the magnetic camera support;

FIGURE 3 is a perspective view of the second base portion of the magnetic support which may be secured to the first portion illustrated in FIGURE 2 by means of magnetic attraction and in interfitted relation therewith;

FIGURE 4 is a fragmentary enlarged vertical sectional view taken substantially upon a plane passing through the center of the magnetic support illustrated in FIGURE 1 of the drawings;

FIGURE 5 is a fragmentary transverse vertical sectional view taken substantially upon a plane passing through the center of the magnetic support;

FIGURE 6 is a perspective view of a modified form of magnetic camera support; and FIGURE 7 is a fragmentary side elevational view of a camera shown with the modified form of magnetic camera support secured thereto.

Referring now more specifically to the drawings the numeral 10 generally designates a press-type camera including a bottom 12 in which a blind threaded bore 14 is formed. The reference numeral 16 generally designates a conventional form of tripod having a pivoted support platform 18 mounted on its upper end and including a base plate 20 which is suitably apertured as at 22 and has an attaching screw 24 rotatably supported therefrom with the shank portion 26 of the attaching screw journaled through the aperture 22.

The platform 20 has a cushioning panel 28 secured thereto and through which the shank portion 26 projects and it may be seen that the first portion 30 of the magnetic camera support which is generally designated by the reference numeral 32 includes a pair of upstanding generally parallel magnetized plates 34 and 36 which are interconnected by means of a block 38 secured therebetween.

A first base plate 40 is provided and includes a pair of opposite side upstanding side walls 42 and 44 which embracingly receives the magnetized plates 34 and 36 therebetween. A plurality of fasteners 45, 46 and 48 are secured through the side walls 42 and 44. The magnetized plates 34 and 36 and the spacing block 38 are disposed with the lower edges of the magnetized plates 34 and 36 resting upon the upper surface of the base plate 40 and the lower surfaces of the spacing block 38 spaced above the upper surface of the base plate 40. In addition, it may be seen from FIGURES 2 and 4 through 6 of the drawings that the uppermost portion of the spacing block 38 terminates a spaced distance below the parellel upper edges of the magnetized plates 34 and 36.

The second portion 50 of the magnetic camera support 30 defines a second base plate and includes a depending and longitudinally extending positioning rib 52. The second base plate 50 is constructed of ferrous material and is therefore positionable and magnetically securable over the upper edges of the plates 34 and 36. The shape and size of the positioning rib 52 is such that it is snugly received between the upper marginal edge portions of the plates 34 and 36 when the second base plate is secured over the plates 34 and 36.

The second base plate 50 also includes a pad 54 which is secured thereover in any convenient manner and it may be seen from FIGURES 3–5 of the drawings that the second base plate 50 is provided with a plurality of bores 56 each provided with a countersink 58. A headed fastener 60 is utilized to secure the second base plate 50 to the bottom 12 of the camera 10 with the shank portion 62 of the fastener 60 being passed through a selected one of the apertures 56 and threadedly engaged in the threaded bore 14 formed in the bottom 12.

The base plate 40 has a threaded bore 64 formed therethrough and the threaded portion 66 of the shank portion 26 of the attaching screw 24 is threadedly engaged in the bore 64 so as to secure the base plate 40 to the platform 20. Thus, it may be seen that the camera 10 is stationarily supported from the platform 20 of the tripod 16 by means of the magnetic attraction between the magnetized plates 34 and 36 and the second base plate 50, the interfitting relationship between the base plate 50 and the upper marginal edge portions of the magnetized plates 34 and 36 serving to reduce any possibility of shifting of the base plate 50 relative to the base plate 40. The base plates 40 and 50 may be readily removably secured to the platform 20 and the bottom 12 of the camera 10, respectively, and thereafter the camera 10 may be quickly removably secured to the platform 20 of the tripod 16 by the magnetic attraction between the plates 34 and 36 and the base plate 50.

With reference now to FIGURES 6 and 7 of the drawings there will be seen a modified form of magnetic camera support generally referred to by the reference numeral 70. The magnetic support 70 includes a pair of magnetized plates 72 and 74 corresponding to the plates 34 and 36 and which have a spacing block 76 secured therebetween by means of the fasteners 78, 80 and 82.

The magnetic support 70 further includes a base plate 84 which is secured between the lower marginal edge portions of the magnetized plates 72 and 74 by means of a hinge pin 86 and a latch pin 88, the latch pin 88 being axially removable so as to enable the base plate 84 to pivot relative to the magnetized plates 72 and 74 as shown in FIGURE 7 of the drawings wherein the magnetic support 70 is secured to the camera 10 by means of a suitable fastener 90 corresponding to the fastener 60, passed through a smooth bore (not shown) corresponding to one of the apertures 56 and secured in the threaded blind bore 14.

As can be seen in FIGURE 7 of the drawings the latch pin 88 may be removed so as to enable the magnetized plates 72 and 74 of the magnetic support 70 to be swung downwardly at their free ends away from the base plate 84 whereby access may be had to the fastener 90.

The magnetic support 70 is designed to be utilized in lieu of the magnetic support 30 when it is not desired to mount the camera 10 on the tripod 16. If it is desired to mount the camera 10 on any support having magnetic properties, the magnetic support 70 may be utilized in lieu of the magnetic support 30 with the edge portions of the magnetized plates 72 and 74 remote from the base plate 84 being utilized to magnetically support the magnetic support 70 and the camera attached thereto from any suitable support to which the magnetized plates 72 and 74 are magnetically attracted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A magnetic camera support comprising a pair of upstanding generally parallel magnetized plates including pairs of upper and lower edge portions, a first base plate, means securing said first base plate between one pair of said corresponding edge portions of said magnetized plates, said first base plate including means adapting said first base plate for removable securement to a first object, a second base plate including an elongated positioning rib projecting laterally outwardly of one side face thereof, said second base plate being removably positionable with said one side face in magnetically attracted frictional engagement with the other pair of said corresponding edges of said parallel plates and with said positioning rib snugly received between said parallel plates, said second base plate including means adapting said second base plate for removable securement to a second object.

2. A magnetic camera support comprising a pair of upstanding generally parallel magnetized plates including pairs of corresponding upper and lower edge portions, a first base plate, means securing said first base plate between one pair of said corresponding edge portions of said magnetized plates, said first base plate including means adapting said first base plate for removable securement to a first object, a second base plate including an elongated positioning rib projecting laterally outwardly of one side face thereof, said second base plate being constructed of ferrous material and being removably positionable with said one side face thereof in magnetically attracted frictional engagement with the other pair of said corresponding edges of said parallel plates and with said positioning rib snugly received between said parallel plates, said second base plate including means adapting said second base plate for removable securement to a second object, said first base plate including upstanding opposite side walls between which said parallel plates are snugly received, the first-mentioned means including means securing said side walls in overlying relation to the lower portions of said parallel plates.

3. A magnetic camera support comprising a pair of upstanding generally parallel magnetized plates including pairs of corresponding upper and lower edge portions, a first base plate, means securing said first base plate between one pair of said corresponding edge portions of said magnetized plates, said first base plate including means adapting said first base plate for removable securement to a first object, a second base plate including an elongated positioning rib projecting laterally outwardly of one side face thereof, said second base plate being constructed of ferrous material and being removably positionable with said one side face thereof in magnetically attracted frictional engagement with the other pair of said corresponding edges of said parallel plates and with said positioning rib snugly received between said parallel plates, said second base plate including means adapting said second base plate for removable securement to a second object, said first base plate including upstanding opposite side walls between which said parallel plates are snugly received, the first-mentioned means including means securing said side walls in overlying relation to the lower portions of said parallel plates with said one pair of corresponding edges of said plates resting upon said first base plate.

4. A magnetic camera support comprising a pair of upstanding generally parallel magnetized plates including pairs of corresponding upper and lower edge portions, a first base plate, means securing said first base plate between one pair of said corresponding edge portions of said magnetized plates, said first base plate including means adapting said first base plate for removable securement to a first object, said means securing said first base plate between said parallel plates including means pivotally securing one end of said first base plate for said parallel plates for rotation about an axis extending between said one pair of corresponding edge portions of said parallel plates adjacent one pair of corresponding end edges thereof, and means releasably securing the other end of said first base plate between said one pair of corresponding edge portions of said parallel plates adjacent the other pair of end edges thereof.

5. A magnetic camera support comprising a base defining a pair of generally parallel and coplanar surface portions and an elongated pocket disposed between and opening outwardly of said surface portions, said base including means adapting said base to be removably secured to a first object, a second base plate including an elongated positioning rib projecting laterally outwardly of one side face thereof defining a second pair of surface portions of said face on opposite sides of said rib and being removably positionable with said second pair of surface portions overlying and supported from said first pair of surface portions and with said positioning rib snugly received in said pocket, said second base plate including means adapting said base plate for removable securement to a second object, at least one pair of said surface portions being magnetized and the other pair of said suface portions being constructed of magnetically attractable material.

6. A magnetic camera support comprising a pair of upstanding generally parallel magnetized plates including pairs of corresponding upper and lower edge portions, a first base plate having one end disposed between and pivotally supported from corresponding end portions of one pair of said corresponding edge portions, said first base plate including means adapting said first base plate for removable securement to a first object, and means releasably securing the other end of said first base plate between said one pair of corresponding edge portions of said parallel plates adjacent the other pair of end edges thereof.

References Cited by the Examiner

UNITED STATES PATENTS 2,906,553  9/1959  Wilson _____ 292—251.5

FOREIGN PATENTS 1,315,865  12/1962  France.

BERNARD A. GILHEANY, *Primary Examiner.*

G. HARRIS, JR., *Assistant Examiner.*